United States Patent
Sun et al.

(10) Patent No.: US 9,448,970 B2
(45) Date of Patent: Sep. 20, 2016

(54) SINGULAR VALUE DECOMPOSITION OF COMPLEX MATRIX

(71) Applicant: Microsoft Technology Licensing, LLC, Redmond, WA (US)

(72) Inventors: Chun Sun, Charlestown, MA (US); Sudarshan Raghunathan, Cambridge, MA (US); Parry Jones Reginald Husbands, Waltham, MA (US); Tong Wen, Quincy, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 260 days.

(21) Appl. No.: 13/918,384

(22) Filed: Jun. 14, 2013

(65) Prior Publication Data

US 2014/0372495 A1  Dec. 18, 2014

(51) Int. Cl.
  *G06F 17/16* (2006.01)

(52) U.S. Cl.
  CPC ........................... *G06F 17/16* (2013.01)

(58) Field of Classification Search
  CPC .......................................... G06F 17/16
  See application file for complete search history.

(56) References Cited

U.S. PATENT DOCUMENTS

| 8,510,364 B1* | 8/2013 | Rao et al. ............... 708/522 |
| 2003/0023650 A1 | 1/2003 | Papathanasiou |
| 2005/0095996 A1 | 5/2005 | Takano |
| 2005/0201307 A1 | 9/2005 | Chae et al. |
| 2006/0106902 A1 | 5/2006 | Howard et al. |
| 2006/0155798 A1* | 7/2006 | Ketchum et al. ............. 708/607 |
| 2009/0216821 A1 | 8/2009 | Nakamura et al. |
| 2012/0314791 A1 | 12/2012 | Zhang et al. |

OTHER PUBLICATIONS

Hemkumar, Nariankadu D., "A Systolic VLSI Architecture for Complex SVD", In Thesis of Rice University, May 1991, 122 pages.
Canning, et al., "Fast Direct Solution of Standard Moment—Method Matrices", In IEEE Antennas and Propagation Magazine, vol. 40, Issue 3, Jun. 1998, 12 pages.

* cited by examiner

*Primary Examiner* — Chuong D Ngo
(74) *Attorney, Agent, or Firm* — Nicholas Chen; Fehmi Chebil; Micky Minhas

(57) ABSTRACT

Computerized singular value decomposition of an input complex matrix. A real-value matrix representation of the input complex matrix is provided to a singular value decomposition module, which correctly obtains a singular value representation of the real-value matrix representation. However, the result is not provided in a form for convenient conversion back into a valid singular value decomposition solution for the original input complex matrix, as the upper left half and lower right half of the diagonal of the diagonal matrix are not identical. A correction module corrects by formulating a corrected diagonal matrix that represents the value of the diagonal of the first diagonal matrix, but shuffled so that the upper left half of the diagonal of the second diagonal matrix is the same as the lower right half of the diagonal of the second diagonal matrix. Corrected unitary matrices may also be formed.

20 Claims, 4 Drawing Sheets

SINGULAR VALUE DECOMPOSITION OF COMPLEX MATRIX

BACKGROUND

Singular value decomposition is a factorization of a matrix A taking the following form: A=USV*, where U is an m-by-m unitary matrix, S is an m-by-n rectangular diagonal matrix (where "m" and "n" are positive integers), and V* (the conjugate transpose of V) is an n-by-n unitary matrix. The diagonal entries of S are non-negative real values referred to as the "singular values" of the matrix A.

In the most general form, the elements of matrix may be real, imaginary (some multiple of $\sqrt{-1}$ symbolically represented as i) or complex numbers (a sum of real and imaginary numbers). A real matrix is a matrix that includes only real numbers as elements. A complex matrix is a matrix that may include elements that are real numbers, but also includes at least one element that is imaginary or complex.

There are a wide variety of software applications that can reliable perform singular value decomposition of a real matrix, but yet cannot perform singular value decomposition of a complex matrix.

BRIEF SUMMARY

At least some embodiments described herein relate to use of a computing system to perform singular value decomposition of an input complex matrix. Conventional singular value decomposition programs often cannot solve for input matrices in which one or more elements are imaginary or complex numbers, even though they reliably perform singular value decomposition of real matrices.

In accordance with the principles described herein, the problem is overcome by having a real-value matrix representation of the input complex matrix provided to a singular value decomposition module. Conventional singular value decomposition modules may then perform singular value decomposition of the real-value matrix representation. The singular value decomposition module correctly obtains a singular value representation of the real-value matrix representation including a left unitary matrix, a diagonal matrix, and a right unitary matrix. Unfortunately, however, the result is not provided in a form that allows for conversion back into a valid singular value decomposition solution for the original input complex matrix. For instance, the upper left half of the diagonal of the diagonal matrix is not identical to the lower right half of the diagonal of the first diagonal matrix.

A correction module corrects for this problem by formulating a corrected diagonal matrix that represents the value of the diagonal of the first diagonal matrix, but shuffled so that the upper left half of the diagonal of the second diagonal matrix is the same as the lower right half of the diagonal of the second diagonal matrix. Furthermore, a corrected left unitary matrix may be formed based on the first left unitary matrix and correlated with which of the values of the diagonal of the first diagonal matrix were shuffled to formulate the diagonal of the second diagonal matrix. A corrected right unitary matrix may be formed based on the first right unitary matrix and correlated with which of the values of the diagonal of the first diagonal matrix were shuffled to formulate the diagonal of the second diagonal matrix.

Accordingly, the principles described herein allow for accurate singular value decomposition of complex matrices using a computing system by leveraging existing capabilities of singular value decomposition modules that accurately perform decomposition on real matrices. A real-value matrix representation is provided to the singular value decomposition module, and the solution is corrected to allow for conversion of the solution to a solution for the original complex matrix.

The obtaining of accurate computerized singular value decomposition for complex matrices has great potential to advance any number of scientific fields in which values are represented in complex form. For instance, in signal processing, signals are often represented in complex form. Other fields that use complex numbers include physics, chemistry, biology, economics, electrical engineering, and statistics. Accordingly, the principles described herein have the potential of solving real-life scientific problems, thereby advancing the state of a wide variety of scientific and engineering arts.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
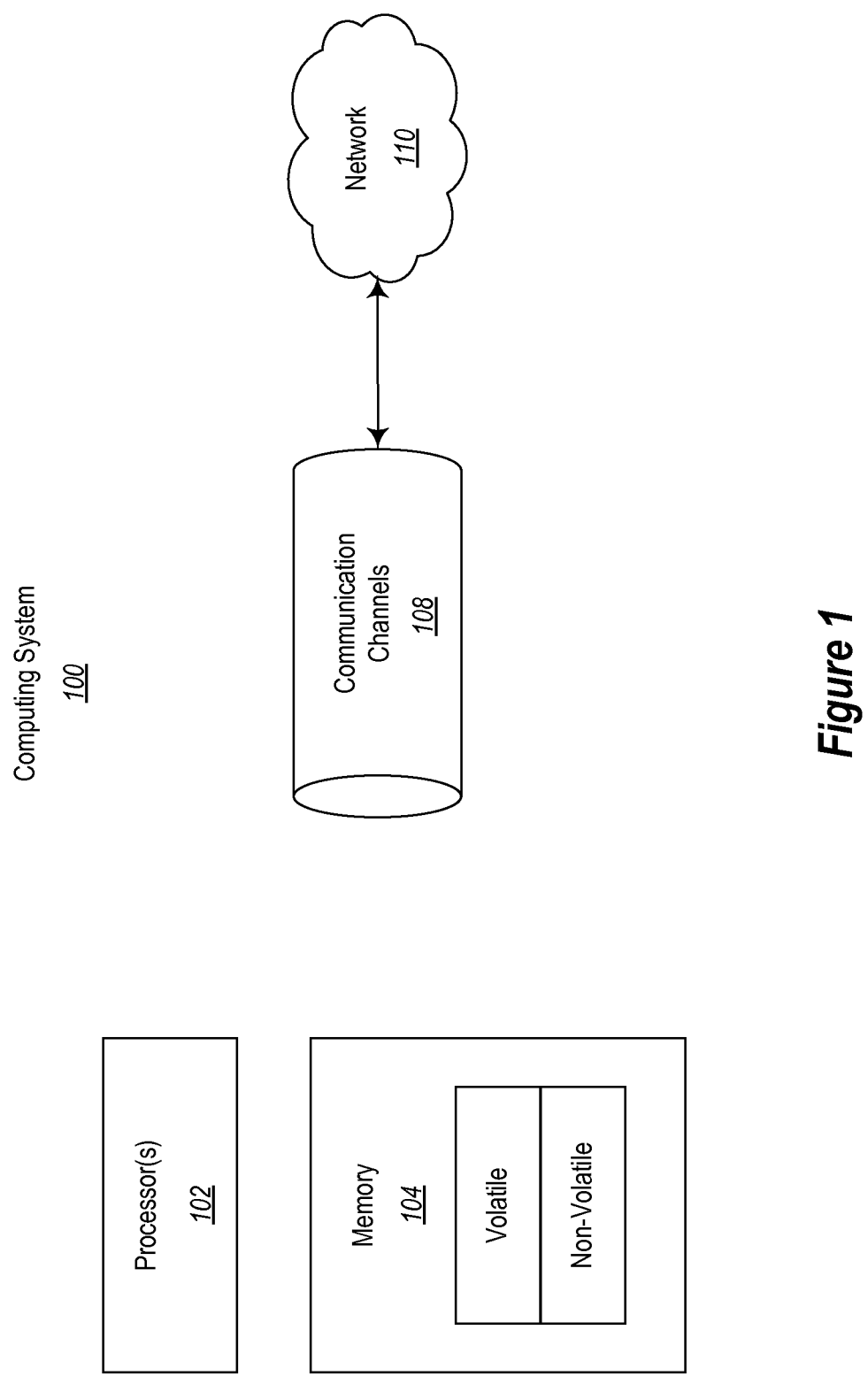
FIG. 1 abstractly illustrates a computing system in which some embodiments described herein may be employed.

At least some embodiments described herein relate to use of a computing system to perform singular value decomposition of an input complex matrix. Conventional singular value decomposition programs often cannot solve for input matrices in which one or more elements are imaginary or complex numbers, even though they reliably perform singular value decomposition of real matrices.

In accordance with the principles described herein, the problem is partially overcome by having a real-value matrix representation of the input complex matrix provided to a singular value decomposition module. Conventional singular value decomposition modules may then perform singular value decomposition of the real-value matrix representation. The singular value decomposition module correctly obtains a singular value representation of the real-value matrix representation including a left unitary matrix, a diagonal matrix, and a right unitary matrix. Unfortunately, however, the result is not provided in a form that allows for conversion back into a valid singular value decomposition solution for the original input complex matrix. For instance, the upper left half of the diagonal of the diagonal matrix is not identical to the lower right half of the diagonal of the first diagonal matrix.

A correction module corrects for this problem by formulating a corrected diagonal matrix that represents the value of the diagonal of the first diagonal matrix, but shuffled so that the upper left half of the diagonal of the second diagonal matrix is the same as the lower right half of the diagonal of the second diagonal matrix. Furthermore, a corrected left unitary matrix may be formed based on the first left unitary matrix and correlated with which of the values of the diagonal of the first diagonal matrix were shuffled to formulate the diagonal of the second diagonal matrix. A corrected right unitary matrix may be formed based on the first right unitary matrix and correlated with which of the values of the diagonal of the first diagonal matrix were shuffled to formulate the diagonal of the second diagonal matrix.

Accordingly, the principles described herein allow for accurate singular value decomposition of complex matrices using a computing system by leveraging existing capabilities of singular value decomposition modules that accurately perform decomposition on real matrices. A real-value matrix representation is provided to the singular value decomposition module, and the solution is corrected to allow for conversion to a solution for the original complex matrix.

The obtaining of accurate computerized singular value decomposition for complex matrices has great potential to advance any number of scientific fields in which values are represented in complex form. For instance, in signal processing, signals are often represented in complex form. Other fields that use complex numbers include physics, chemistry, biology, economics, electrical engineering, and statistics. Accordingly, the principles described herein have the potential of solving a real-life scientific problems, thereby advancing the state of a wide variety of scientific and engineering arts.

Some introductory discussion of a computing system will be described with respect to FIG. 1. Then, embodiments of the performing of singular value decomposition of a complex matrix will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
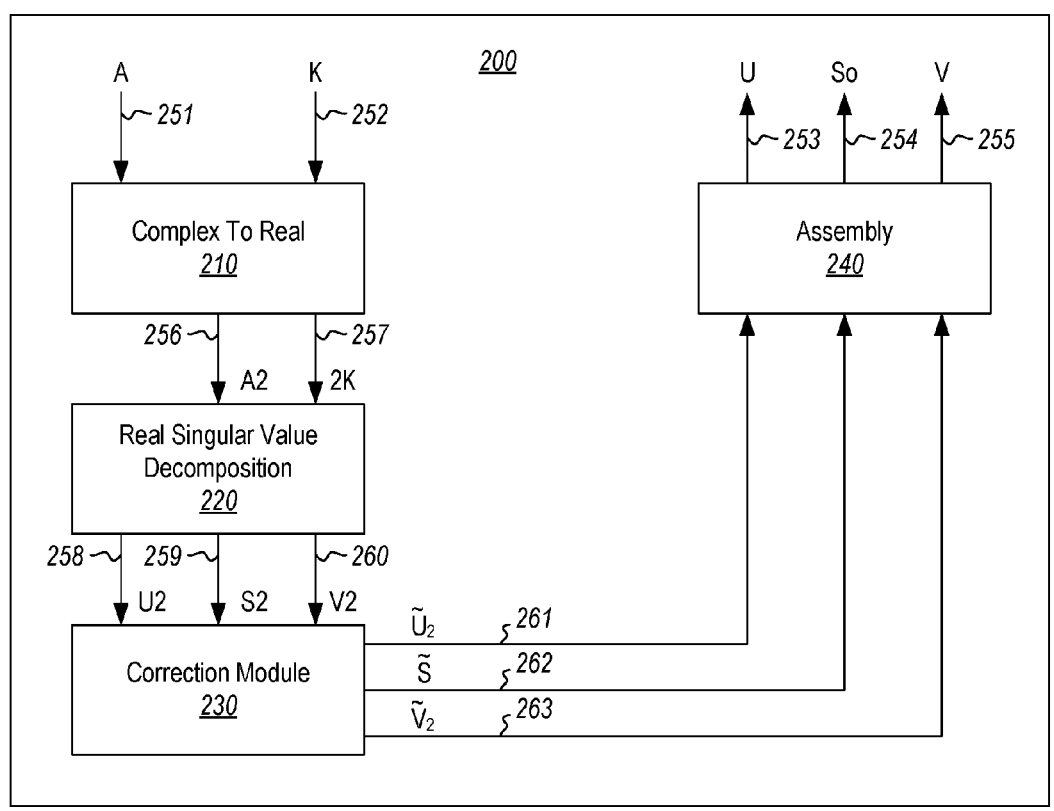
FIG. 2 abstractly illustrates a complex matrix singular value decomposition module.

FIG. 2 illustrates a complex matrix singular value decomposition module 200. As input, the complex matrix singular value decomposition module 200 receives an input complex matrix A (represented by arrow 251) and perhaps a number of singular values k to solve for (represented by arrow 252). In response, the complex matrix singular value decomposition module 200 performs singular value decomposition of the input complex matrix, and generates a singular value decomposition of the input complex matrix in the form of a left unitary matrix U (as represented by arrow 253, a diagonal matrix $S_0$ (as represented by arrow 254), and a right unitary matrix V (as represented by arrow 255).

The following function called "svdv2" is an example of a complex matrix singular value decomposition module 200 function that will be used as a specific example throughout this description:

function[USV]=svdv2(A,k)

Figure 3:
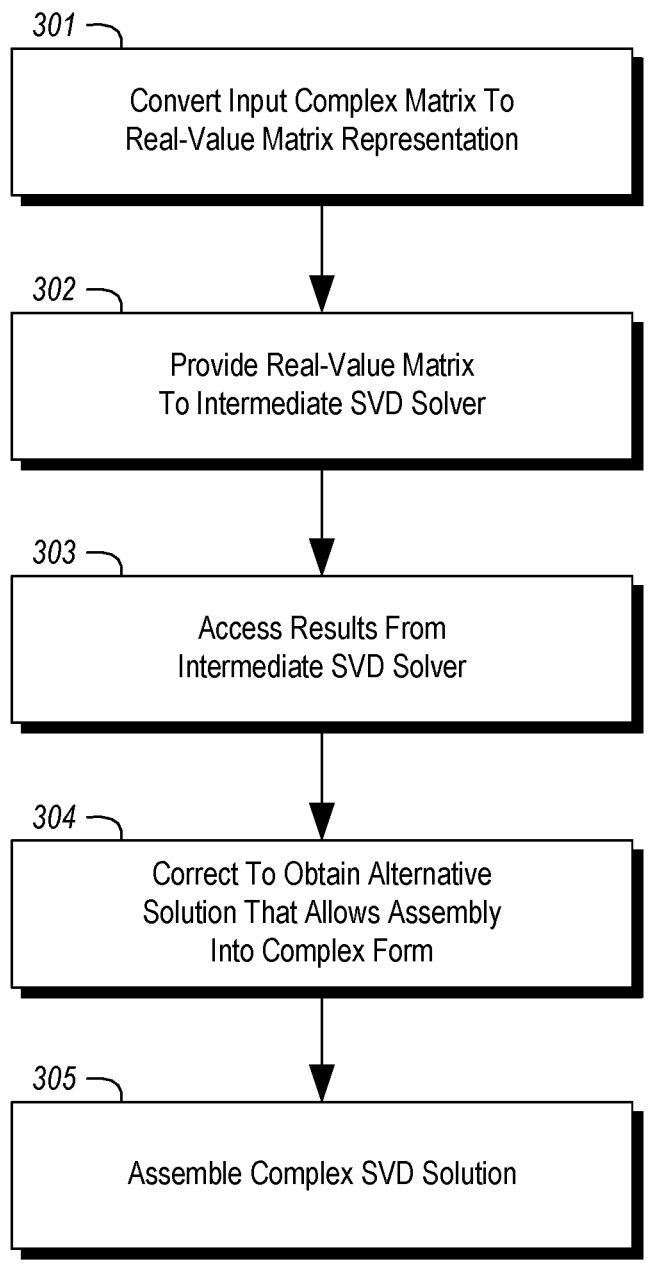
FIG. 3 illustrates a flowchart of a method for performing singular value decomposition of a complex matrix.

FIG. 3 illustrates a flowchart of a method 300 for performing singular value decomposition of an input complex matrix. As the method 300 of FIG. 3 may be performed by the complex matrix singular value decomposition module 200 of FIG. 2, the description of FIGS. 2 and 3 will be intermingled.

The complex matrix singular value decomposition module 200 includes a complex-to-real matrix conversion module 210 that converts the input complex matrix into a real-value matrix representation of the input complex matrix (reference act 301 of FIG. 3). It is known that a complex matrix A may be converted into a real matrix A2 using the following equation:

$$A2 = \begin{bmatrix} A_R & A_I \\ -A_I & A_R \end{bmatrix}$$

where $A_R$ is the same size as complex matrix A, but in which the elements are composed of only the real part of the corresponding complex matrix element; and wherein $A_I$ is the same size as the complex matrix A, but in which the elements are composed of only the imaginary part of the corresponding complex matrix element.

The following is a code example showing the complex-to-real matrix conversion module (spanning from the line "[m n]=size(A);" to the line AI=image(A)") within the example complex matrix singular value decomposition module svdv2 as follows:

```
function [U S V] = svdv2 (A, k)
    [m n] = s i z e (A);
    assert (m==n);
    assert (k <=m);
    S = zeros (k,k);
    U = zeros (m,k);
    V = zeros (m,k);
    AR = real (A);
    AI = imag(A);
    A2 = [[AR ,AI ];[ −AI ,AR ]];
    ....
    end;
```

Here, m and n are set equal to the number of rows and columns in the input complex matrix A. The input complex matrix is a square matrix with equal number of rows and columns. Furthermore, the number of singular values in the solution should be equal to or less than the number of rows of the input complex matrix. The ultimate output matrices U, S, and V are initialized to be filled with zeros, with proper dimensions such that the multiplication USV results in a matrix of the size of the input complex matrix A. It yet remains to fill the elements of such matrices U, S and V with their appropriate values representing a singular value decomposition solution given the input complex matrix A. The real matrix values matrix AR and the imaginary matrix value matrix AI are derived based on the input complex matrix A, and the resulting real-value representation A2 of the input complex matrix A is derived. For instance, if the matrix A is a 1000-by-1000 complex matrix with 1,000,000 elements, matrix A2 would be a 2000-by-2000 real matrix with 4,000,000 elements.

Referring to FIG. 2, the complex-to-real matrix conversion module 210 provides the real-value matrix representation A2 of the complex matrix A to an intermediate singular value decomposition module 220 (as represented by arrow 256 in FIG. 2, and act 302 in FIG. 3) to perform singular value decomposition of the real-value matrix.

For instance, in the specific code example, there is a call to the intermediate singular value decomposition module called svds (see underlining) as follows:

```
function [U S V] = svdv2 (A, k)
    [m n] = s i z e (A);
    assert (m==n);
    assert (k <=m);
    S = zeros (k,k);
    U = zeros (m,k);
    V = zeros (m,k);
    AR = real (A);
    AI = imag(A);
    A2 = [[AR ,AI ];[ −AI ,AR ]];
    [U2 S2 V2 f lag ] = svds(A2,2*k);
    ....
    end
```

Here, in the underlined line, the intermediate singular value decomposition module svds is provided with the real-value matrix representation A2. The number of singular values is input as 2*k (as represented by arrow 257 in FIG. 2). Recall that the size of the real-value matrix A2 is twice in each dimension that of the complex matrix A. The output from this function is an initial left unitary matrix U2 (as represented by arrow 258), an initial diagonal matrix S2 (as represented by arrow 259), and an initial right unitary matrix V2 (as represented by arrow 260). The "flag" output is provided to represent a case in which the singular value decomposition does not converge. The method may continue as long as the singular value decomposition does converge on a solution.

The output from the intermediate singular value decomposition module 210 is an accurate output for the real-value representation A2. Thus, from this output, we know that A2 can be factored into the sequence multiplication of matrices U2, S2, and V2. Furthermore, the initial diagonal matrix truly is a diagonal matrix with non-negative values on its diagonal, and with zero values elsewhere. Thus, matrices U2, S2 and V2 are valid output given the real-value representation A2.

The problem is that the output is not presented in a form that can be easily transformed into singular value decomposition of the original input matrix A. Specifically, one singular value solution of the real-value matrix representation A2 takes the following form:

$$\tilde{S} = \begin{bmatrix} S_0 & 0 \\ 0 & S_0 \end{bmatrix}$$

where $S_0$ represents a k-by-k matrix that represents an actual diagonal matrix (that contains the singular values of A) that represents an actual component of the singular value decomposition solution of the original complex matrix A; and wherein "0" represents a k-by-k matrix of zeros.

In this structure, the upper left half of the diagonal (the diagonal of the upper left instance of $S_0$) is identical to the lower right half of the diagonal (the diagonal of the lower left instance of $S_0$). Thus, to be helpful, the diagonal matrix component of the signature value decomposition of the real-value matrix A2 should take the following form:

$$\tilde{S} = \begin{bmatrix} s_1 & 0 & \cdots & 0 & 0 & 0 & \cdots & 0 \\ 0 & s_2 & \cdots & 0 & 0 & 0 & \cdots & 0 \\ \vdots & \vdots & \ddots & 0 & \cdots & 0 & \cdots & \cdots \\ 0 & 0 & 0 & s_k & 0 & 0 & \cdots & 0 \\ 0 & 0 & \vdots & 0 & s_1 & 0 & \cdots & 0 \\ 0 & 0 & 0 & 0 & 0 & s_2 & \cdots & 0 \\ \vdots & \vdots & \vdots & \vdots & \vdots & \vdots & \ddots & 0 \\ 0 & 0 & \vdots & 0 & 0 & 0 & 0 & s_k \end{bmatrix}$$

where $s_1$ through $s_k$ are the singular values of the complex matrix A.

Unfortunately, the diagonal matrix from the singular value decomposition of the real-value matrix A2 might, for instance, take the following form:

$$S = \begin{bmatrix} s_1 & 0 & 0 & 0 & \cdots & \cdots & 0 & 0 \\ 0 & s_1 & 0 & 0 & \cdots & \cdots & 0 & 0 \\ 0 & 0 & s_2 & 0 & \cdots & \cdots & 0 & 0 \\ 0 & 0 & 0 & s_2 & \cdots & \cdots & 0 & 0 \\ \vdots & \vdots & \vdots & \vdots & \ddots & \cdots & \vdots & \vdots \\ \vdots & \vdots & \vdots & \vdots & \vdots & \ddots & \vdots & \vdots \\ 0 & 0 & 0 & 0 & \cdots & \cdots & s_k & 0 \\ 0 & 0 & 0 & 0 & \cdots & \cdots & 0 & s_k \end{bmatrix}$$

In this case, the singular values are listed in non-ascending order, each singular value repeated twice. Thus, we end of with an output of the form $A2=U2S2V2^T$ instead of the desired output $A2=A2=\tilde{U2}\,\tilde{S}\,\overline{V2}$.

The singular value decomposition output U2, S2 and V2 are provided to a correction module 230 (act 303). The correction module then formulates the corrected output (act 304) using the initial singular value decomposition results. Specifically, the correction module 230 formulates a corrected diagonal matrix $\tilde{S}$, a corrected left unitary matrix $\tilde{U2}$, and a corrected right unitary matrix $\overline{V2}$.

Figure 4:
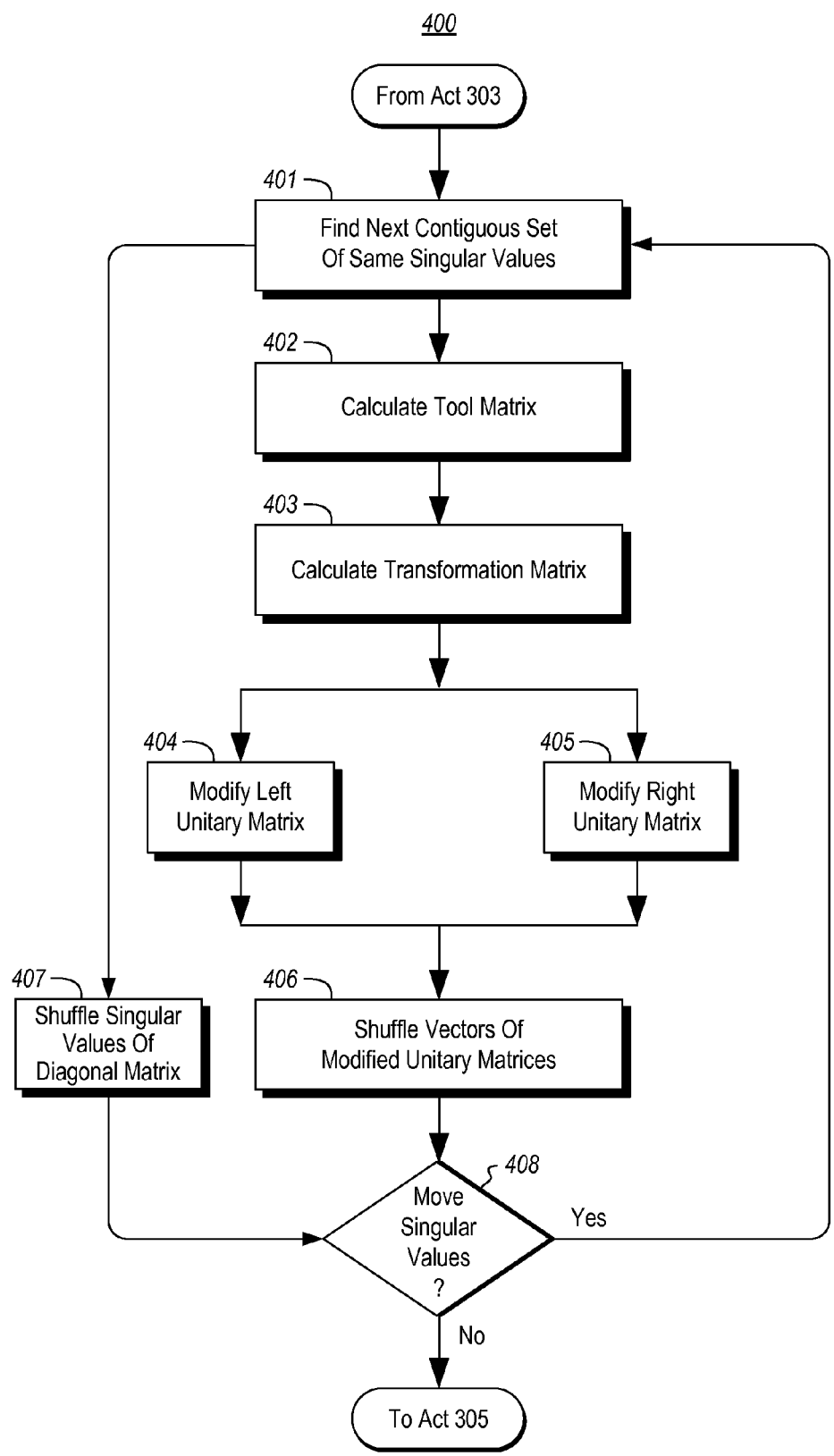
FIG. 4 illustrates a flowchart of a method for correcting output of a singular value decomposition of a real-value representation of a complex matrix so as to be more easily transformed into a singular value decomposition of the original complex matrix.

FIG. 4 illustrates one method 400 for performing the correction of act 304. In this method, a contiguous set of same singular values are found on the diagonal of the initial diagonal matrix S2 (act 401). The following underlined code provided in the context of the function svdv2 illustrates how this might be done.

```
function [U S V] = svdv2 (A, k)
    [m n] = s i z e (A);
    assert (m==n);
    assert (k <=m);
    S = zeros (k,k);
    U = zeros (m,k);
    V = zeros (m,k);
    AR = real (A);
    AI = imag(A);
    A2 = [[AR ,AI ];[ –AI ,AR ]];
    [U2 S2 V2 f lag ] = svds (A2 ,2* k);
    Sd = diag(S2 );
    shift = 1;
    eps = 1e –10;
    U2t = zeros ( s i z e(U2 ));
    S2t = zeros ( s i z e(S2 ));
    V2t = zeros ( s i z e(V2 ));
    while ( shift < 2*k )
        % find singular values / vectors with same numerical value
        s = s0 = Sd( shift );
        ibegin = shift ;
        do
            shift = shift + 1;
            if (shift >2*k)
                break;
            endif ;
            s = Sd( shift);
        until ( abs(s–s0)>eps);
        iend = shift –1;
        [ U2t S2t V2t ] = svdShuffle (U2 , S2 , V2 ,ibegin,iend,U2t,
    S2t , V2t);
    end;
....
end
```

For instance, consider again the example in which input complex matrix A is a 1000-by-1000 matrix, and its real-value representation A2 is thus a 2000-by-2000 matrix. Suppose further that k (the number of singular values is to be 900. This would result in the function svds generating matrix U2 as a 2000-by-1800 matrix, matrix S2 as an 1800-by-1800 matrix, and matrix V2 as a 2000-by-1800 matrix.

Now suppose that the first iteration of act 401 resulted in a finding that the first four singular values found in the diagonal of S2 were the same, or substantially the same within a given amount of tolerable error (hereinafter, the "contiguous singular values that are the same"). In that case, while still in the "while" routine, the function svdShuffle would be called for the first time with the following input values:

U2: The 2000-by-1800 matrix as generated by svds;
S2: The 1800-by-1800 matrix as generated by svds;
V2: The 2000-by-1800 matrix as generated by svds;
ibegin: a value of 1 representing the identifier of the column containing for the beginning of the contiguous singular values that are the same;

iend: a value of 4 representing the identifier of the column containing for the beginning of the contiguous singular values that are the same;

U2t: A working matrix representation of U2 initialized with all zeros;

S2t: A working matrix representation of S2 initialized with all zeros; and

V2t: A working matrix representation of V2 initialized with all zeros.

A tool matrix (referred to herein as Q) is then calculated (act 402) based on the columns of the initial left (or right) unitary matrix U2 that correspond to the columns of the contiguous set of same singular values found in the initial diagonal matrix. For instance, suppose that the input complex matrix A is a 1000-by-1000 matrix. In that case, the real-value representation A2 would be a 2000-by-2000 matrix. Now suppose that the first iteration of act 401 resulted in a finding that the first four singular values found in the diagonal of S2 were the same, or substantially the same within a given amount of tolerable error. In that case, the tool matrix would be calculated based on the first four columns of the initial left unitary matrix U2, or the first four columns of the initial right unitary matrix V2. As an example, the tool matrix might be calculated using the following equation:

$$Q = Vtall^T * R * Vtall$$

where Vtall is a 1000-by-4 matrix representing the first 4 columns of the initial right unitary matrix V2, and wherein R is a 1000-by-1000 matrix represented by the form $$\begin{bmatrix} 0 & -I \\ I & 0 \end{bmatrix},$$

where further I is an identity matrix of size 500-by-500, and where 0 is a 500-by-500 matrix of zeros.

Note that Q would be a square matrix in which the number of rows and the number of columns is equal to the number of consecutive same (or substantially the same) singular values found in the diagonal of the initial diagonal matrix S2. This might be accomplished using the following lines of code of the function svdShuffle:

```
function [UT ST VT] = svdShuffle (UA , SA , VA , ibegin ,
iend , UTi , STi , VTi )
    assert ( mod (ibegin ,2)==1);
    assert ( mod (iend ,2)==0);
    assert ( ibegin < iend );
    n = iend – ibegin + 1;
    N = length(UA (: ,1));
    n2 = n/2;
    N2 = N/2;
    V = VA (:, ibegin : iend );
    U = UA (:, ibegin : iend );
    R = [ [ zeros (N2), –eye(N2 )]; [eye(N2), zeros (N2 )] ];
    Q = V '*R*V;
...
end;
```

A transformation matrix (referred to herein as M1) is then calculated based on the tool matrix Q (act 403). For instance, a function called solveM could be called from the svdShuffle function and provided with an input Q as follows (note underlining):

```
function [UT ST VT] = svdShuffle (UA , SA , VA , ibegin ,
iend , UTi , STi , VTi )
    assert ( mod (ibegin ,2)==1);
    assert ( mod (iend ,2)==0);
    assert ( ibegin < iend );
    n = iend – ibegin + 1;
    N = length(UA (: ,1));
    n2 = n/2;
    N2 = N/2;
    V = VA (:, ibegin : iend );
    U = UA (:, ibegin : iend );
    R = [ [ zeros (N2), –eye(N2 )]; [eye(N2), zeros (N2 )] ];
    Q = V '*R*V;
    M1 = solveM (Q);
...
end;
```

For instance, the function solveM that solves for the transformation matrix may be as follows:

```
function [M] = solveM (Q)
    [m n] = size (Q);
    assert (m==n);
    assert ( mod (n ,2)==0);
    n2 = n/2;
    M = rand(n, n2 );
    T = zeros (n,n2 );
    i=1;
    M(: ,1) = M(: ,1) / norm(M (: ,1));
    T(: ,1) = Q*M(: ,1);
    T(: ,1) = T(: ,1) – proj (M(: ,1) ,T (: ,1));
    for i = 2 : n2
        for j = 1 : i –1
            M(:,i) = M(:,i) – proj (M(:,j),M(:,i)) – proj (T(:,j),M(:,i ));
        end;
        M(:,i) = M(:,i) / norm(M(:,i));
        T(:,i) = Q*M(:,i);
        T(:,i) = T(:,i) – proj (M(:,i),T(:,i ));
        for j = 1 : i –1
            T(:,i) = T(:,i) – proj (M(:,j),T(:,i)) – proj (T(:,j),T(:,i ));
        end;
        T(:,i) = T(:,i) / norm(T(:,i));
    end;
end;
```

For completeness, the following defines the function proj:

```
function [t] = proj (u,v)
    t = (u '*v )/(u '*u) * u;
end;
```

This code calculates a transformation matrix M1 having a number of rows equal to the number of consecutive same (or substantial the same) singular values found in the diagonal of the initial diagonal matrix S2, which is 4 in this example. The number of columns is half that amount, or 2 in this example. Thus, the transformation matrix M1 would be a 4-by-2 matrix.

The first vector m1 of the matrix m1 is calculated to be any normalized vector in z-dimensional space where z is the number of consecutive same (or substantially the same) number of singular values found in this set. This assignment is found by the following two lines of code in the example:

M=rand(n, n2);
M(: ,1)=M(: ,1)/norm(M (: ,1));

However, another vector t1 is also found, which is orthonormal to m1 using the following code:

T(: ,1)=Q*M(: ,1);
T(: ,1)=T(: ,1)–proj (M(: ,1),T (: ,1));

Each subsequent vector mi (wherein i is an integer equal to or greater than 2 up to an including the last column of the matrix M1), the vector mi is calculated to be a normal vector that is orthogonal to any prior vector mj, or tj (where j is an integer less than i). This is represented by the code within the for loop in the function solveM.

The method 400 then includes formulating a modified left unitary matrix using the transformation matrix (act 404). This may be performed several columns at a time. For instance, in the case where the set of same or similar singular values is 4, this might be performed on the matrix 4 columns at a time. The transformation may be as follows:

Utallleft=Utall*M1 (which would be a 1000-by-2 matrix in the example);
Utallright=R*Utallleft (which would also be a 1000-by-2 matrix in the example); and
Unewtall=[Utallleft Utallright] (which would be a 1000-by-4 matrix in the example.

Likewise, the method includes formulation of a modified right unitary matrix using the transformation matrix (act 405). Once again, this may be performed several columns at a time. For instance, in the case where the set of same or similar singular values is four, this might be performed on the matrix 4 columns at a time. The transformation may be as follows:

Vtallleft=Vtall*M1 (which would be a 1000-by-2 matrix in the example);
Vtallright=R*Vtallleft (which would also be a 1000-by-2 matrix in the example); and
Vnewtall=[Vtallleft Vtallright] (which would be a 1000-by-4 matrix in the example.

The following underlined code, in the context of the svdShuffle function, illustrate how this might be accomplished:

```
function [UT ST VT] = svdShuffle (UA , SA , VA , ibegin ,
iend , UTi , STi , VTi )
    assert ( mod (ibegin ,2)==1);
    assert ( mod (iend ,2)==0);
    assert ( ibegin < iend );
    n = iend – ibegin + 1;
    N = length(UA (: ,1));
    n2 = n/2;
    N2 = N/2;
    V = VA (:, ibegin : iend );
    U = UA (:, ibegin : iend );
    R = [ [ zeros (N2), –eye(N2 )]; [eye(N2), zeros (N2 )] ];
    Q = V '*R*V;
    M1 = solveM (Q);
    V1 = V*M1;
    V2 = R*V1;
    VB = [V1 V2 ];
    U1 = U*M1;
    U2 = R*U1;
    UB = [U1 U2 ];
    ...
    end;
```

At this point, the left and right unitary matrices may be shuffled (act 406). The singular values of the diagonal matrix may also be shuffled (act 407). The shuffling of the singular values of the diagonal matrix (act 407) is not dependent on the calculation of the tool matrix Q (act 403), the calculation of the transformation matrix M1 (act 404), or the modification of the unitary matrices U2 and V2 (acts 405 and 406). Accordingly, the shuffling of the singular values of the diagonal matrix (act 407) is shown as a separate act as compared to the shuffling of the singular vectors of the left and right unitary matrices (act 406). However, for coding and/or runtime efficiency, they may occur substantially at the same time as in the following underlined code in the context of svdShuffle:

```
function [UT ST VT] = svdShuffle (UA , SA , VA , ibegin ,
iend , UTi , STi , VTi )
    assert ( mod (ibegin ,2)==1);
    assert ( mod (iend ,2)==0);
    assert ( ibegin < iend );
    n = iend – ibegin + 1;
    N = length(UA (: ,1));
    n2 = n/2;
    N2 = N/2;
    V = VA (:, ibegin : iend );
    U = UA (:, ibegin : iend );
    R = [ [ zeros (N2), –eye(N2 )]; [eye(N2), zeros (N2 )] ];
    Q = V '*R*V;
    M1 = solveM (Q);
    V1 = V*M1;
    V2 = R*V1;
    VB = [V1 V2 ];
    U1 = U*M1;
    U2 = R*U1;
    UB = [U1 U2 ];
    ibegin2 = ( ibegin +1)/2;
    [en em] = s i z e(SA);
    en2 = en /2;
    UT = UTi ;
    VT = VTi ;
    ST = STi ;
    for i = 1:n2
        k1 = ibegin2 + i – 1;
        k2 = ibegin2 + i – 1 + en2;
        p = ibegin + i – 1;
        ST(k1 ,k1) = SA(p,p);
        ST(k2 ,k2) = SA(p+1,p +1);
        UT (:, k1) = UB (:,i);
        UT (:, k2) = UB (:,i+n2);
        VT (:, k1) = VB (:,i);
        VT (:, k2) = VB (:,i+n2);
    end;
end;
```

The result of the first iteration of svdShuffle results in reshuffling associated with a single set of same singular values. If there are more sets of singular values ("Yes" in decision block 408), then the process repeats for the next contiguous set of same (or substantially the same) singular values in the initial diagonal unitary matrix. For instance, the code stays within the "while" loop of the svdv2 method.

Once there are no more contiguous sets of same (or substantially the same) singular values in the diagonal of the initial diagonal matrix ("No" in decision block 408), the resulting corrected matrices $\bar{U}_2$, $\tilde{S}$, and $\bar{V}_2$ are provided to an assembly module 240 (as represented by arrows 261, 262 and 263), which performs assembly of the results into an actual singular value decomposition solution (act 305) in the form of matrices U, $S_0$ and V. For instance, this might be accomplished using the following final underlined code of the svdv2 function:

```
function [U S V] = svdv2 (A, k)
    [m n] = s i z e (A);
    assert (m==n);
    assert (k <=m);
    S = zeros (k,k);
    U = zeros (m,k);
    V = zeros (m,k);
    AR = real (A);
    AI = imag(A);
    A2 = [[AR ,AI ];[ –AI ,AR ]];
    [U2 S2 V2 f lag ] = svds (A2 ,2* k);
    Sd = diag(S2 );
    shift = 1;
    eps = 1e –10;
    U2t = zeros ( s i z e (U2 ));
    S2t = zeros ( s i z e (S2 ));
    V2t = zeros ( s i z e (V2 ));
```

-continued

```
while ( shift < 2*k )
    % find singular values / vectors with same numerical value
    s = s0 = Sd( shift );
    ibegin = shift ;
    do
        shift = shift + 1;
        if (shift >2* k)
            break;
        endif ;
        s = Sd( shift );
    until ( abs(s-s0)>eps );
    iend = shift -1;
    [ U2t S2t V2t ] = svdShuffle (U2 , S2 , V2 , ibegin , iend , U2t , S2t , V2t );
end;
S = S2t (1:k ,1:k);
U = complex (U2t (1:m ,1: k), -U2t (m+1:m+m,1:k));
V = complex (V2t (1:m ,1: k), -V2t (m+1:m+m,1:k));
end
```

Accordingly, the principles described herein allow for the accurate solving of a singular value decomposition of a complex matrix using an underlying singular value decomposition module that is capable of performing singular value decomposition of real matrices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable physical storage devices having stored therein computer-executable instructions that, when executed by one or more processors of a computing system, cause the computing system to instantiate a complex matrix singular value decomposition module that can perform singular value decomposition of an input complex matrix, the complex matrix singular value decomposition module comprising:
   a correction module;
   an intermediate singular value decomposition module; and
   an assembly module;
   the intermediate singular value decomposition module configured to provide a first singular value decomposition of a real-value matrix representation of an input complex matrix, wherein the first singular value decomposition comprises a first left unitary matrix, a first diagonal matrix, and a first right unitary matrix, wherein an upper left half of the diagonal of the first diagonal matrix is not identical to the lower right half of the diagonal of the first diagonal matrix;
   the correction module configured to correct the first singular value decomposition of a real-value matrix representation of an input complex matrix;
   the correction module also configured to perform the correction to formulate a second singular value decomposition of the real-value matrix representation of the input complex matrix by formulating a second diagonal matrix, such that the diagonal of the second diagonal matrix represents the value of the diagonal of the first diagonal matrix, but shuffled so that the upper left half of the diagonal of the second diagonal matrix is the same as the lower right half of the diagonal of the second diagonal matrix; and
   the assembly module configured to assemble the results of the correction module into an actual singular value decomposition solution of the input complex matrix.

2. The computer program product in accordance with claim 1, wherein the correction module is further configured to perform the correction by performing:
   an act of formulating a second left unitary matrix based on the first left unitary matrix and correlated with which of the values of the diagonal of the first diagonal matrix were shuffled to formulate the diagonal of the second diagonal matrix.

3. The computer program product in accordance with claim 2, wherein formulating the second left unitary matrix comprises:
   an act of identifying a transformation matrix;
   an act of applying the transformation matrix to the first left unitary matrix to form a transformed left unitary matrix; and
   an act of shuffling vectors of the transformed left unitary matrix to form the second left unitary matrix.

4. The computer program product in accordance with claim 3, wherein formulating the second left unitary matrix is also based on a tool matrix that is derived using at least one of the first left unitary matrix and the first right unitary matrix.

5. The computer program product in accordance with claim 3, wherein the correction module is further configured to perform the correction by performing:
   an act of formulating a second right unitary matrix based on the first right unitary matrix and correlated with which of the values of the diagonal of the first diagonal matrix were shuffled to formulate the diagonal of the second diagonal matrix.

6. The computer program product in accordance with claim 5, wherein formulating the second right unitary matrix comprises:
   an act of applying the transformation matrix to the first right unitary matrix to form a transformed right unitary matrix; and
   an act of shuffling vectors of the transformed right unitary matrix to form the second right unitary matrix.

7. The computer program product in accordance with claim 5, wherein formulating the second right unitary matrix is also based on the tool matrix.

8. The computer program product in accordance with claim 2, wherein formulating the second left unitary matrix is also based on a tool matrix that is derived using at least one of the first left unitary matrix and the first right unitary matrix.

9. The computer program product in accordance with claim 8, wherein the correction module is further configured to perform the correction by performing:
   an act of formulating a second right unitary matrix based on the first right unitary matrix and correlated with which of the values of the diagonal of the first diagonal matrix were shuffled to formulate the diagonal of the second diagonal matrix.

10. The computer program product in accordance with claim 9, wherein formulating the second right unitary matrix is also based on the tool matrix.

11. The computer program product in accordance with claim 1, wherein the correction module is further configured to perform the correction by performing:
    an act of formulating a second right unitary matrix based on the first right unitary matrix and correlated with which of the values of the diagonal of the first diagonal matrix were shuffled to formulate the diagonal of the second diagonal matrix.

12. The computer program product in accordance with claim 11, wherein formulating the second right unitary matrix comprises:
   an act of identifying a transformation matrix;
   an act of applying the transformation matrix to the first right unitary matrix to form a transformed right unitary matrix; and
   an act of shuffling vectors of the transformed right unitary matrix to form the second right unitary matrix.

13. The computer program product in accordance with claim 11, wherein formulating the second left unitary matrix is also based on a tool matrix that is derived using at least one of the first left unitary matrix and the first right unitary matrix.

14. The computer program product in accordance with claim 1, wherein the complex matrix singular value decomposition module further comprises:
   a complex-to-real matrix conversion module configured to convert the input complex matrix into the real-value matrix representation of the input complex matrix.

15. The computer program product in accordance with claim 1, wherein the complex matrix includes at least one value that represents a signal.

16. The computer program product in accordance with claim 1, wherein the complex matrix includes at least one value that represents a chemical or chemical interaction.

17. The computer program product in accordance with claim 1, wherein the complex matrix includes at least one value that represents a biological process.

18. The computer program product in accordance with claim 1, wherein the complex matrix includes at least one value that represents an economic relationship.

19. A system comprising:
   one or more computer processors;
   one or more computer-readable storage devices having stored therein computer-executable instructions that, when executed by the one or more processors of the system, cause the system to instantiate a complex matrix singular value decomposition module that can perform singular value decomposition of an input complex matrix, the complex matrix singular value decomposition module comprising:
   a correction module; and
   an intermediate singular value decomposition module; and
   an assembly module;
   the correction module configured to correct first singular value decomposition of a real-value matrix representation of an input complex matrix, the first singular value decomposition provided by the intermediate singular value decomposition module, wherein the first singular value decomposition comprises a first left unitary matrix, a first diagonal matrix, and a first right unitary matrix, wherein an upper left half of the diagonal of the first diagonal matrix is not identical to the lower right half of the diagonal of the first diagonal matrix;
   the correction module also configured to perform the correction to formulate a second singular value decomposition of the real-value matrix representation of the input complex matrix by
   formulating a second diagonal matrix, such that the diagonal of the second diagonal matrix represents the value of the diagonal of the first diagonal matrix, but shuffled so that the upper left half of the diagonal of the second diagonal matrix is the same as the lower right half of the diagonal of the second diagonal matrix; and
   the assembly module configured to assemble the results of the correction module into an actual singular value decomposition solution of the input complex matrix.

20. A computer-implemented method implemented by a computing system having one or more processors for performing singular value decomposition of an input complex matrix, wherein said one or more processors execute instructions that cause the computing system to instantiate a complex matrix singular value decomposition module comprising a correction module, an intermediate singular value decomposition module, and an assembly module, the method comprising:
   converting the input complex matrix into a real-value matrix representation of the input complex matrix;
   providing the real-value matrix representation to the intermediate singular value decomposition module to perform singular value decomposition of the real-value matrix;
   accessing by the correction module a first singular value decomposition of the real-value matrix representation from the intermediate singular value decomposition module as a result of performing singular value decomposition of the real-value matrix, the first singular value decomposition comprising a first left unitary matrix, a first diagonal matrix, and a first right unitary matrix, and an upper left half of the diagonal of the first diagonal matrix not being identical to the lower right half of the diagonal of the first diagonal matrix;
   correcting the first singular value decomposition by the correction module to create a corrected second singular value decomposition by performing:
   formulating a second diagonal matrix, such that the diagonal of the second diagonal matrix represents the value of the diagonal of the first diagonal matrix, but shuffled so that the upper left half of the diagonal of the second diagonal matrix is the same as the lower right half of the diagonal of the second diagonal matrix;
   formulating a second left unitary matrix based on the first left unitary matrix and correlated with which of the values of the diagonal of the first diagonal matrix were shuffled to formulate the diagonal of the second diagonal matrix; and
   formulating a second right unitary matrix based on the first right unitary matrix and correlated with which of the values of the diagonal of the first diagonal matrix were shuffled to formulate the diagonal of the second diagonal matrix; and
   assembling by the assembly unit the results of the correction module into an actual singular value decomposition solution of the input complex matrix.

* * * * *